United States Patent [19]

Hartness et al.

[11] Patent Number: 5,937,995
[45] Date of Patent: Aug. 17, 1999

[54] LANER FOR DESCRAMBLING AND ARRANGING ARTICLES IN SINGLE FILES WITH REDUCED JAMMING

[75] Inventors: Thomas Patterson Hartness, Greenville; Mark W. Davidson, Greer, both of S.C.

[73] Assignee: Hartness International, Inc., Greenville, S.C.

[21] Appl. No.: 08/749,911

[22] Filed: Nov. 15, 1996

[51] Int. Cl.[6] .................................................. B65G 47/12
[52] U.S. Cl. ............................................ 198/445; 198/453
[58] Field of Search ................................... 198/445, 446, 198/453

[56] References Cited

U.S. PATENT DOCUMENTS

| | | | |
|---|---|---|---|
| 1,196,442 | 8/1916 | Eick . | |
| 2,690,831 | 10/1954 | Gersley | 198/446 |
| 2,753,037 | 7/1956 | Davis | 193/23 |
| 3,117,665 | 1/1964 | Nekola et al. | 198/453 |
| 3,117,669 | 1/1964 | Schwarz | 209/80 |
| 3,552,537 | 1/1971 | Vamvakas | 193/31 |
| 3,575,713 | 4/1971 | Duff et al. | 134/23 |
| 3,710,918 | 1/1973 | Babunovic | 198/445 |
| 3,710,919 | 1/1973 | Maters | 198/30 |
| 3,830,359 | 8/1974 | Fogelberg | 198/30 |
| 4,029,195 | 6/1977 | Hartness et al. | 198/399 |
| 4,105,398 | 8/1978 | Disch et al. | 432/121 |
| 4,623,059 | 11/1986 | Agnew | 198/452 |
| 4,723,649 | 2/1988 | Hartness et al. | 198/442 |
| 4,962,843 | 10/1990 | Ouellette | 198/453 |
| 4,976,343 | 12/1990 | Fuller | 198/453 |
| 5,143,200 | 9/1992 | Fuller | 198/453 |
| 5,170,879 | 12/1992 | Smith | 198/452 |
| 5,311,979 | 5/1994 | Risley et al. | 198/453 |
| 5,660,263 | 8/1997 | Moncrief et al. | 198/445 |

FOREIGN PATENT DOCUMENTS

| | | | |
|---|---|---|---|
| 1004103 | 3/1957 | Germany | 198/445 |

*Primary Examiner*—Joseph E. Valenza
*Attorney, Agent, or Firm*—Cort Flint

[57] ABSTRACT

A laner is disclosed for a case packing machine which divides scrambled articles into single files with reduced jamming, malfunctioning, and breakage. The laner includes lane dividers which are spaced to provide a plurality of lanes having parallel sections with entry openings wide enough to receive at least 3 articles in a side-by-side arrangement. The lanes terminate in single file lanes having a spacing generally equal to the width of one article. A tapered transition section extends between the parallel sections and the single file sections for feeding the articles into the single file lanes. A racking device is included in each lane upstream from the single file sections which projects laterally into the lane to impart a wedging and racking force and action to the articles that assist in their single file arrangement in the single file sections of the lanes. In addition, article conveyors are utilized in which a first conveyor feeds the articles to the entry opening of the parallel sections of the lanes and terminates at a dead space downstream of the entry openings. A second conveyor picks up the articles on the other side of the dead space. The first conveyor may be operated at a slower conveyance speed than the second conveyor to provide a conveyance speed differential that assists in alleviating any jamming that might occur at the entry openings by assisting in an inward collapsing of the articles. This, together with the anti-jamming effect produced by the racking devices, provides for a reliable continuous flow of bottles from the scrambled mass to single files for processing at a slug metering or pick up station.

15 Claims, 7 Drawing Sheets

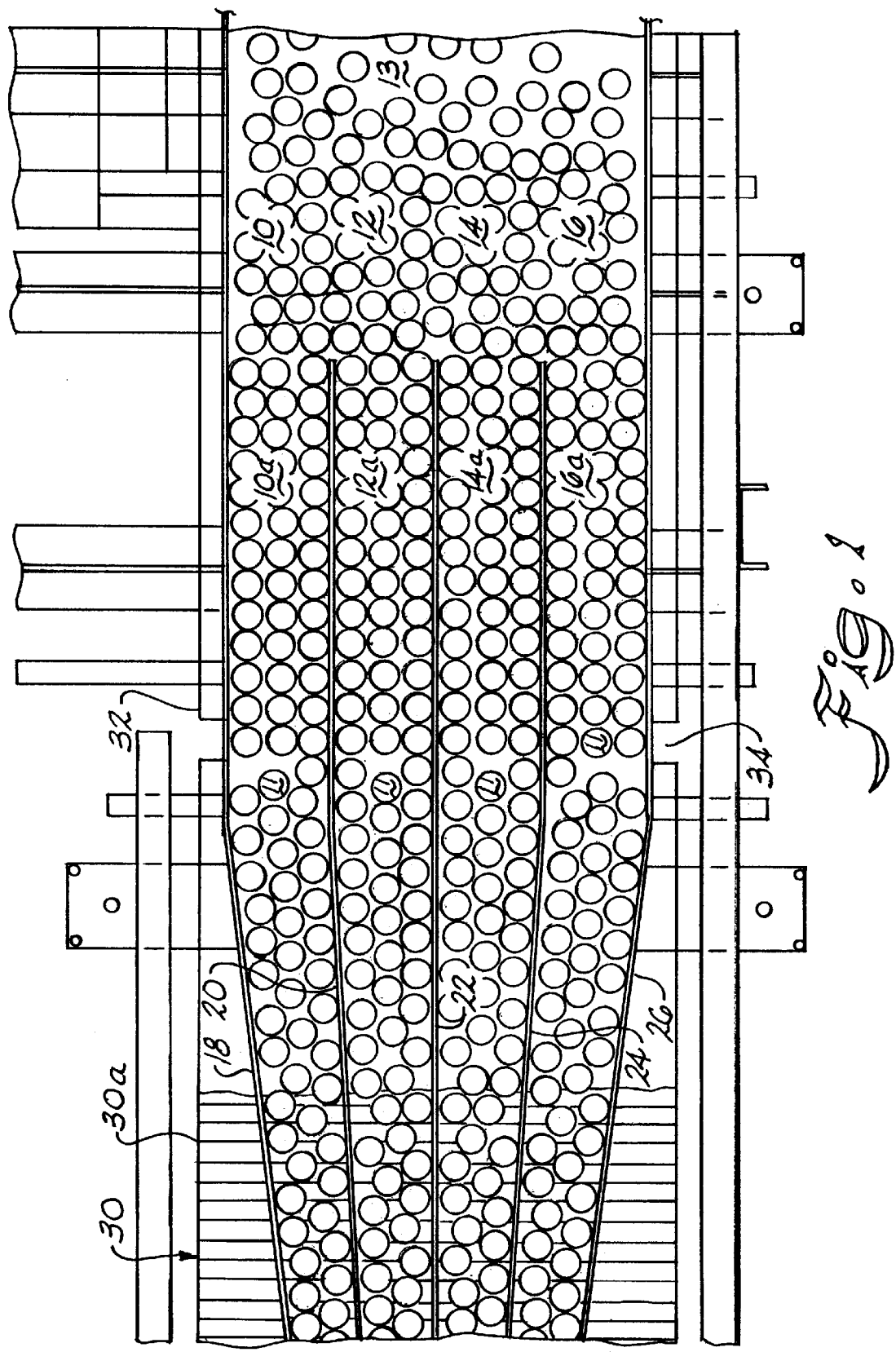

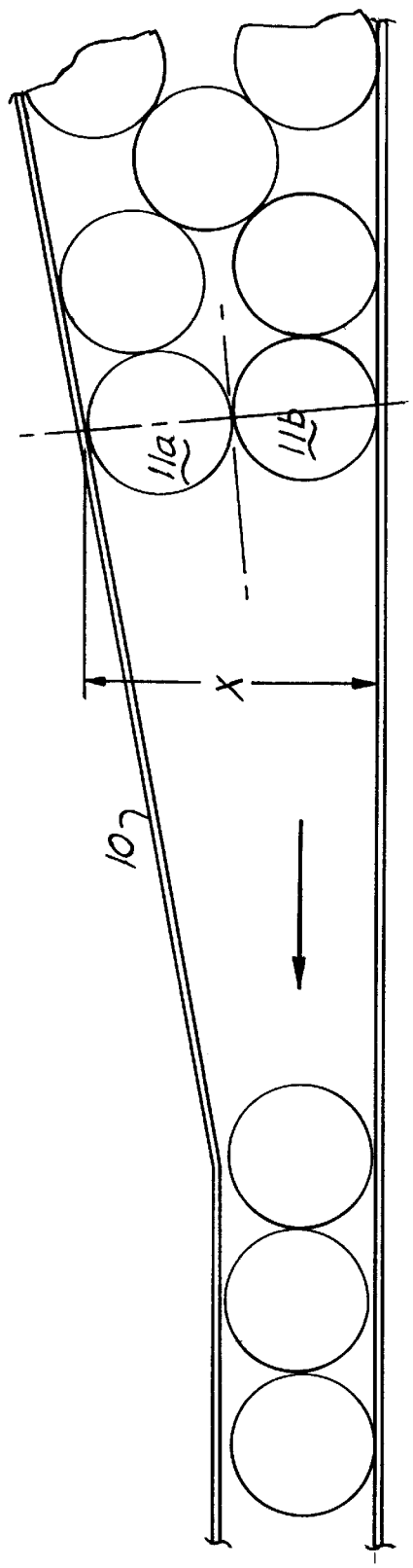
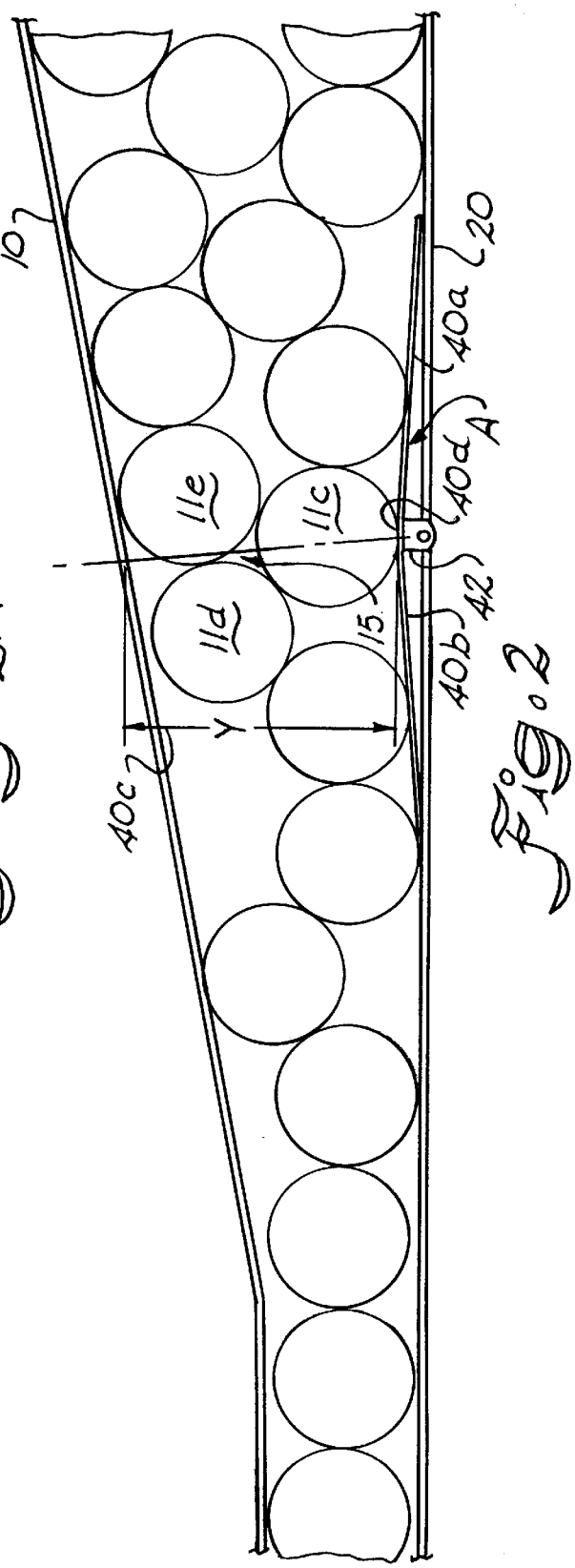

LANER FOR DESCRAMBLING AND ARRANGING ARTICLES IN SINGLE FILES WITH REDUCED JAMMING

BACKGROUND OF THE INVENTION

This invention relates to article packing machine, and specifically to the feeding of articles, such as bottles, on a conveyor for packing into a case. In particular, the invention relates to an apparatus for automatically dividing a scrambled mass of articles into single files on an article packing machine without malfunctioning caused by article jamming and misalignment in the feeding and packing process.

In article packing machines such as bottled packing machines, bottles are typically conveyed on a conveyor in a commingled or scrambled manner. It is necessary to separate the articles into divided lanes for further conveyance of the articles to a pickup station where the articles are separated into a predefined number, referred to as a "slug". The slug of articles is then picked up by an article gripper head and transferred to a case packing station. The articles then are lowered into a case at the packing station which may or may not be a partitioned case. Prior bottling handling machines are shown in U.S. Pat. Nos. 3,481,108 and 3,555,770.

The section of the packing machine which receives the scrambled articles and separates them into divided lanes and single files is commonly referred to as a "laner" such as illustrated in U.S. Pat. No. 4,723,649. This patent discloses a pivoting guide chute which swings back and forth across a conveyor to discharge a predetermined numbers of articles intermittently into parallel lanes through actuation of jaws and/or a pressor bar clamp assembly. This requires a relatively complex mechanism but is satisfactory for many applications.

Another laner for descrambling and arranging articles is disclosed in U.S. Pat. No. 3,575,713 wherein scrambled bottles are feed into a plurality of lanes which taper into a single file of articles. The lanes appear to accommodate approximately three of the articles across their width during the conveyance process. U.S. Pat. No. 3,710,919 discloses a self arranging conveyor wherein containers supplied in a random fashion are arranged in a single file by being caused to follow a zig-path on a conveyor. The patent notes that the use of three containers advance in a side-by-side relationship results in the containers not being jammed. Tapering inlet guides are utilized to convey the containers in the zig-zag path. U.S. Pat. No. 5,311,979 shows moving containers in rows of side-by-side files to a funnel which arranges the containers in a single file. U.S. Pat. No. 5,170,879 discloses moving scrambled bottles into a single file by first arranging them in slugs of three containers in a row.

While the above laners have attempted to provide the feeding of containers or articles from a scrambled mass into divided lanes, the prior laners and mechanisms have not been entirely satisfactory for operating without jamming, breakage, and/or downtime. If the laner malfunctions and a bottle or container is missing, at the slug metering and/or pick up stations, broken containers and glass often results. Thus, it is necessary that all the bottles or containers be in place as they reach the downstream processing stations, or substantial downtime is required to stop the machine for correction. Non-uniform pressures and speeds occurring between the articles of adjacent parallel files caused by fallen or missing articles increases the malfunctioning problem at the slug metering at pick-up stations.

A phenomenon often referred to as "pyramiding" or "soldiering" occurs when two articles, such as bottles, come into a side-by-side arrangement and a third article wedges into the crevice of the side-by-side articles wedging them if they are constrained in their outward movement and causing a jam. The phenomenon also can occur when a first article strikes a leading edge of a lane divider. In, this situation, if two articles become side-by-side, and a third article wedges behind the article striking the edge, pyramiding or soldiering occurs. This is caused by a continual repetition of this alignment behind the article striking the edge. That is, two articles are side-by-side, a single article is nested in the crevice of the side-by-side articles, two other side-by-side articles become nested behind a single article, another single article nests in the crevice of the next two side-by-side articles and the pyramiding or soldiering keeps going back up the line. It's almost an accidental perfect alignment that results in jamming. However when running thousands of articles that change configurations all the time, this can happen. The scrambled articles can be nice and smooth and all of a sudden one bottle gets in exactly the right position and hits the edge of one of the lane dividers and all the rest of the articles pyramid behind it and the conveyance stops.

Accordingly, an object of the present invention is to provide an improved laner for an article packing machine which feeds articles with reduced jamming and malfunctioning.

Another object of the present invention is to provide a laner for an article packing machine where jamming of articles at the entry opening of the lane dividers is minimized to provide uninterrupted article flow into the lanes and subsequent packing machine sections.

Another object of the present invention is to provide a laner having an arrangement of lane dividers which receive and descrambles a mass of articles in a reliable manner and processes the articles into single files without jamming.

Another object of the present invention is to provide a laner which separates scrambled articles into single files and provides constant, regulated line pressure between the single file articles as they are fed to the slug metering and case pick up stations for reliable processing.

Another object of the present invention is to provide a laner for dividing scrambled articles into wide parallel lanes in a manner that allows for slower conveyor speeds of the infeed conveyor resulting in less impact between the lane dividers and/or the articles to prevent jamming and/or breakage.

SUMMARY OF THE INVENTION

The above objectives are accomplished according to the present invention by providing apparatus for descrambling a mass of articles and arranging the articles in single, parallel files on a case packing machine which comprises a plurality of lane dividers forming a plurality of article lanes arranged in a side-by-side manner. The article lanes include parallel descrambling sections having a first predetermined width, tapered sections for receiving the articles from the descrambling sections including transition sections through which the articles pass for processing into parallel single files, and parallel single-file sections receiving the articles from the transition sections having a second predetermined width which corresponds generally to a lateral dimension of the articles so that the articles are arranged generally in single files in the single-file sections.

In accordance with the invention, a plurality of racking devices are carried in the transition section of the lanes upstream from the single file sections. The racking devices project laterally into the transition sections of the lanes for engaging the articles as they are conveyed causing the articles to assume a generally racked configuration which reduces jamming as the articles are processed into the single files in the parallel single-file sections of the article lanes.

Preferably, each of the article lanes begins with a descrambling section formed by substantially parallel lane dividers having a first predetermined spacing which is generally about three times a lateral dimension of the articles. Each article lane terminates in a single-file section formed by substantially parallel lane dividers having a second predetermined spacing which corresponds generally to the lateral dimension of the articles so that the articles are arranged generally in a single file in the single-file section. While the first predetermined width may be greater than at least 2.8 times the lateral dimension of the article, it has been found that a width is approximately three (3) times the lateral dimension of the article plus a tolerance in the range of ⅛" to ¼" is preferable.

Advantageously, the racking devices include a wedging mechanism in the form of an infeed kicker plate which tapers outwardly toward a center of the transition section, and an outfeed kicker plate which tapers inwardly away from the center of the transition section. The kicker plates are flexible. The infeed kicker plate and said outfeed kicker plate join at a generally rigid apex portion which defines a throat forming a constriction in the transition section. The throat is defined between the apex portion and an opposing lane divider of the lane so that the transition section is constricted in relation to the flow of the articles. Adjustable mounts mount the racking devices at longitudinally adjustable positions along the length of the transition sections of the article lanes for optimum performance. The throat has a dimension which is less than the dimension of two of the articles in a side-by-side arrangement.

Further aspects of the invention include a first conveyor for feeding scrambled articles to an entry opening of the descrambling lanes, a second conveyor for conveying descrambled articles downstream of the entry opening, and a dead space between the first and second conveyors located downstream of the entry opening. The first conveyor may have a conveyance speed less than that of the second conveyor so that a force of impact of the articles is reduced upon entry into the entry opening and inward collapse into the opening is provided to alleviate jamming if such occurs. dr

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 1 is a top plan view of a laner which receives a scrambled mass of articles on a conveyor and processes them into a plurality of juxtaposed article lanes and finally into single-file lanes according to the invention;

FIG. 2 is a top plan view of one lane and single file of articles of the laner of FIG. 1 having a racking or wedging device for racking the articles into the single file arrangement without jamming during the transition from article infeed end of the laner according to the invention; and FIG. 2A is a top plan view illustrating the jamming of articles in a corresponding configuration to FIG. 2 without a wedging device;

DESCRIPTION OF A PREFERRED EMBODIMENT

Figure 1A:
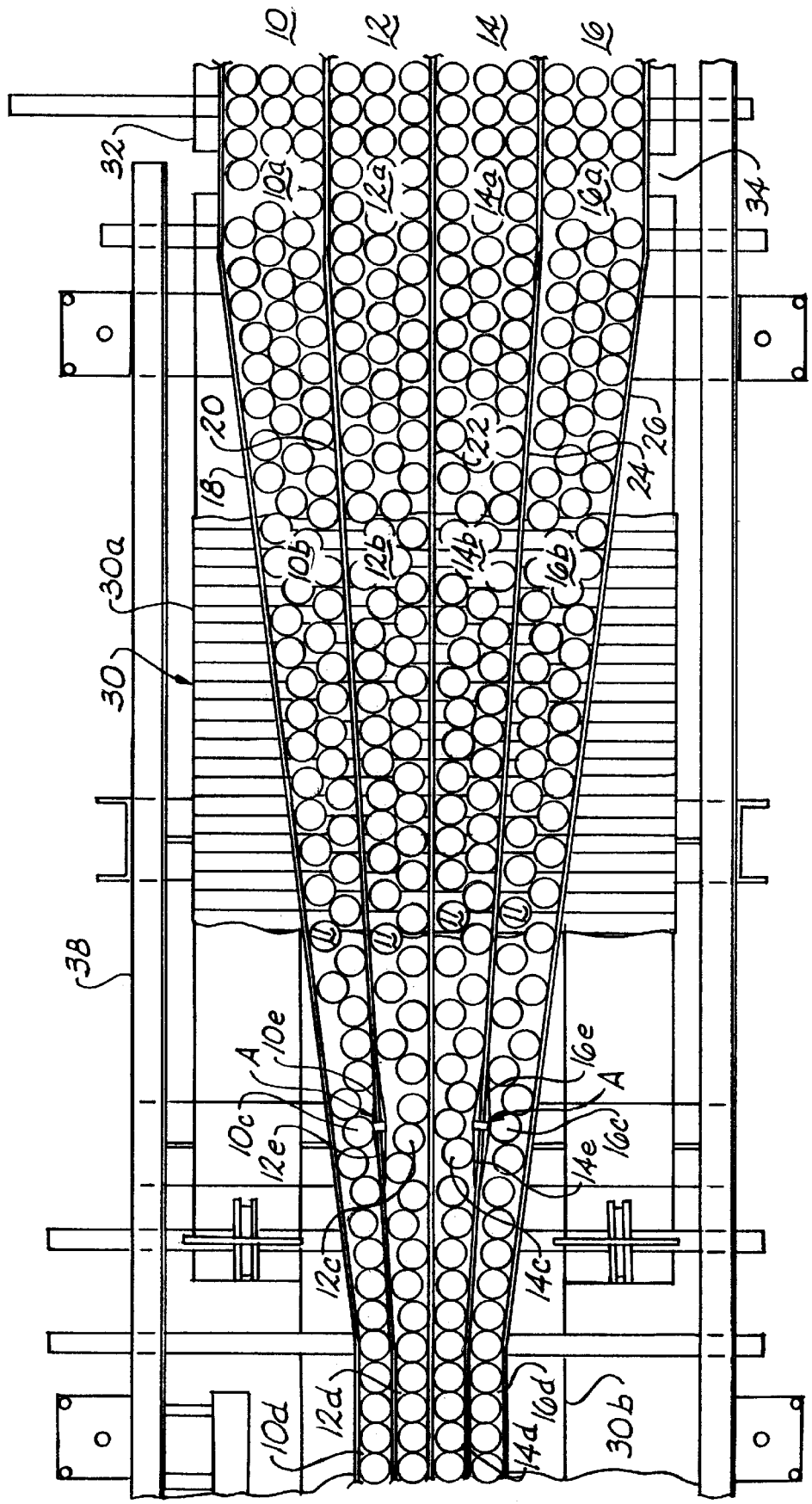
FIG. 1A is a further top plan view of the laner of FIG. 1 showing the single-file lanes, and descrambling lanes which accommodate at least three articles in which the articles are processed into four single file lanes.

Referring now in more detail to the drawings, the invention will now be described in more detail. As can be best seen in FIGS. 1 and 1A, a plurality of lanes 10, 12, 14, and 16 are illustrated which are formed by lane dividers 18, 20, 22, 24, and 26, respectively. In this embodiment, four descrambling lanes taper into 4 single-file lanes. Four single-file lanes are typically required for case packing. These lane dividers and lanes are supported above article conveyors designated generally as 30 and 32. The conveyors may be any suitable conveyors such as that disclosed in U.S. Pat. No. 4,723,649, incorporated by reference herein. Conveyor 30 includes at least a first traveling conveyor run 30a and a second narrower conveyor run 30b. Typically conveyor 32 feeds the articles onto the first mentioned conveyor 30, and the conveyors may be run at different speeds. The laner is carried on a typical laner frame 38 which may consist of various welded or bolted beams and flanges. As can best be seen in FIG. 1A, conveyor 32 feeds articles 11 in a scrambled mass into the entry end of lanes 10–16. Here, conveyor 32 terminates at a dead space 34 which is a distance past the leading edges and entry openings of the lane dividers. By operating conveyor 32 at a speed slower than conveyor 30, any articles striking the leading edges do so with less impact and jamming. The speed differential also allows the articles to collapse inwardly when lane widths according to the invention are utilized.

The lanes 10–16 include parallel sections 10a–16a, converging or tapered sections 10b–16b, transition sections 10c–16c, and parallel, single file sections 10d–16d, as can best be seen in FIG. 1. As shown in FIG. 1A, the articles enter the parallel sections of the lanes from scrambled mass 13 of the articles on an infeed conveyor at the entry openings of the lanes. Each parallel section 10a–16a has a width which is slightly greater than three times the width of an article, e.g. three times the width, plus ⅛" to ¼". This has been found highly advantageous in descrambling the mass of articles without jamming. The bottles enter into the lanes without a build up and subsequent jamming and "soldiering". If a buildup occurs, such as in the event an article strikes a leading edge of one of the lane dividers, the articles are allowed to collapse inwardly into the parallel section due to the spacing. Also the conveyance speed differential facilitates inward collapsing and further alleviates any tendency to jam in combination with the lane spacing, and allows the article to be processed and divided between the lane dividers. It has been found that the spacing or width "W" of the lanes should be at least 2.8 times the width of the bottles, and is preferably three times the bottle width plus ⅛" to ¼". In an advantageous aspect of the invention, the lanes may be made three times the width of the largest articles to be packed by the machine. When articles having a smaller width or diameter are processed, they automatically are provided with the anti-jamming effect. only the spacing of the single-file sections needs to be changed according to the article size. The laner of the present invention combines the descrambling affect at the entry openings of the lanes with further anti-jamming aspects of the invention as the lanes taper to single files as will now be described in more detail.

It can be seen that once the bottles are uniformly feed into the parallel sections, they are processed through tapered sections 10b–16b until they reach transition sections 10c–16c where racking or wedging devices, designated generally as A, rack the articles into a single file arrangement for entry into the single file lanes 10d–16d. A wedging device 10e–16e is provided in each lane. There must be one wedging device for each lane that is processed into a single file of articles.

Referring now to FIG. 2, the racking or wedging device will be described in more detail. Device A includes an infeed kicker plate 40a and an out feed kicker plate 40b. Preferably the kicker plates are flexible and may be formed from spring, steel, or plastic. A bridge portion 40d is located at the junction of infeed and out feed kicker plates and creates a restricted throat 40c having a dimension "Y". The throat is restricted in the sense that distance Y is less than a distance "X" (FIG. 2A) which corresponds to the width of two articles arranged in a side-by-side row such as at 11a, 11b. The throat constriction allows the articles to rack and be configured as shown by articles 11c, 11d, 11e. In this racking configuration, article 11c is nested within a crevice 15 defined between articles 11d and 11e. The racking action and configuration is much like that of a rack of pool balls where adjacent balls engage the crevices of adjacent balls. This action is illustrated in more detail in FIG. 3 wherein it can be seen that infeed plate 40a flexes to accommodate articles in the area of transition section 11c wherein the dimension is greater than a width of two articles so that two articles do not become side-by-side and jammed as they enter the throat. On the outfeed end, outfeed kicker plate 40b flexes to accommodate the racking of the articles and allow the articles to transition into the single file arrangements in the single file lane 10d.

Figure 7:
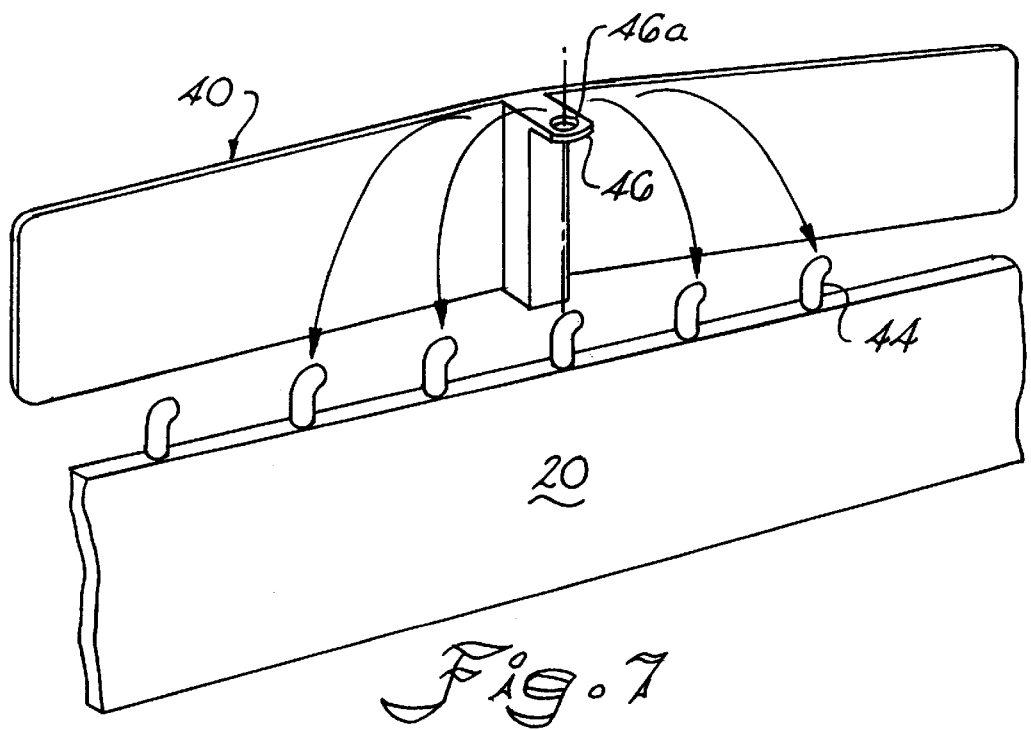
FIG. 7 is an alternate embodiment of a wedging device and attachment to a lane divider according to the embodiment of FIG. 1 of the invention.
Figure 6:
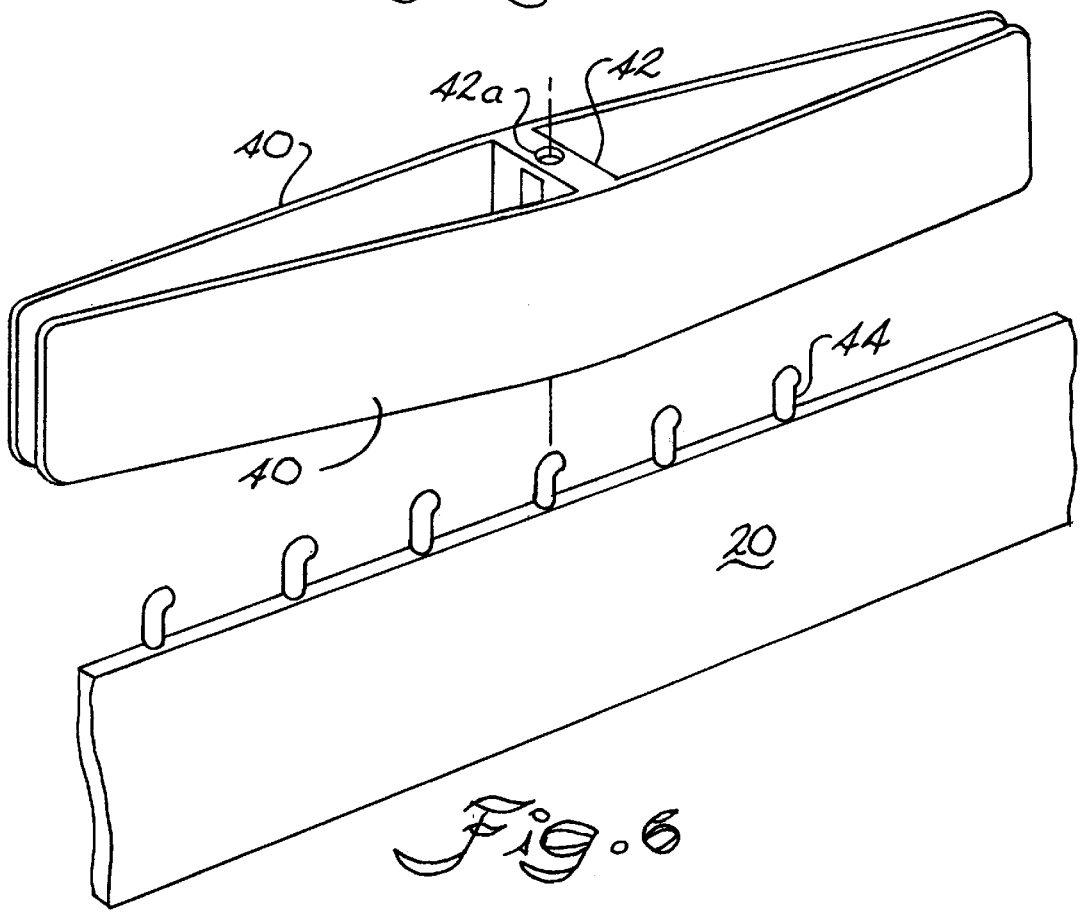
FIG. 6 is a perspective view of a wedging device and attachment to a lane divider according to the invention.

The exact positioning of the wedging devices along the length of the lanes for optimum performance may be adjusted by using an attachment as shown in FIG. 7 wherein a plurality of posts 44 are carried on a top edge of lane divider 20 which fit with a tab portion 46 of the wedging device by means of an opening 46a which fits over the post. The wedging device thus is removable and may be located as desired by selecting a different post. The wedging devices facilitate the arrangement of the single files of articles without jamming and pyramiding in the lane. The pyramiding effect happens as described previously when two side-by-side articles are jammed by a third article coming into a wedging engagement within the crevice between the two articles. Other articles hitting the nested articles cause the two side-by-side articles to be wedged outwardly and tightened in their locking arrangement between the lane dividers. Soldiering or pyramiding then is likely to occur. This is particularly acute when the lane dividers are converging as illustrated.

Figure 5:
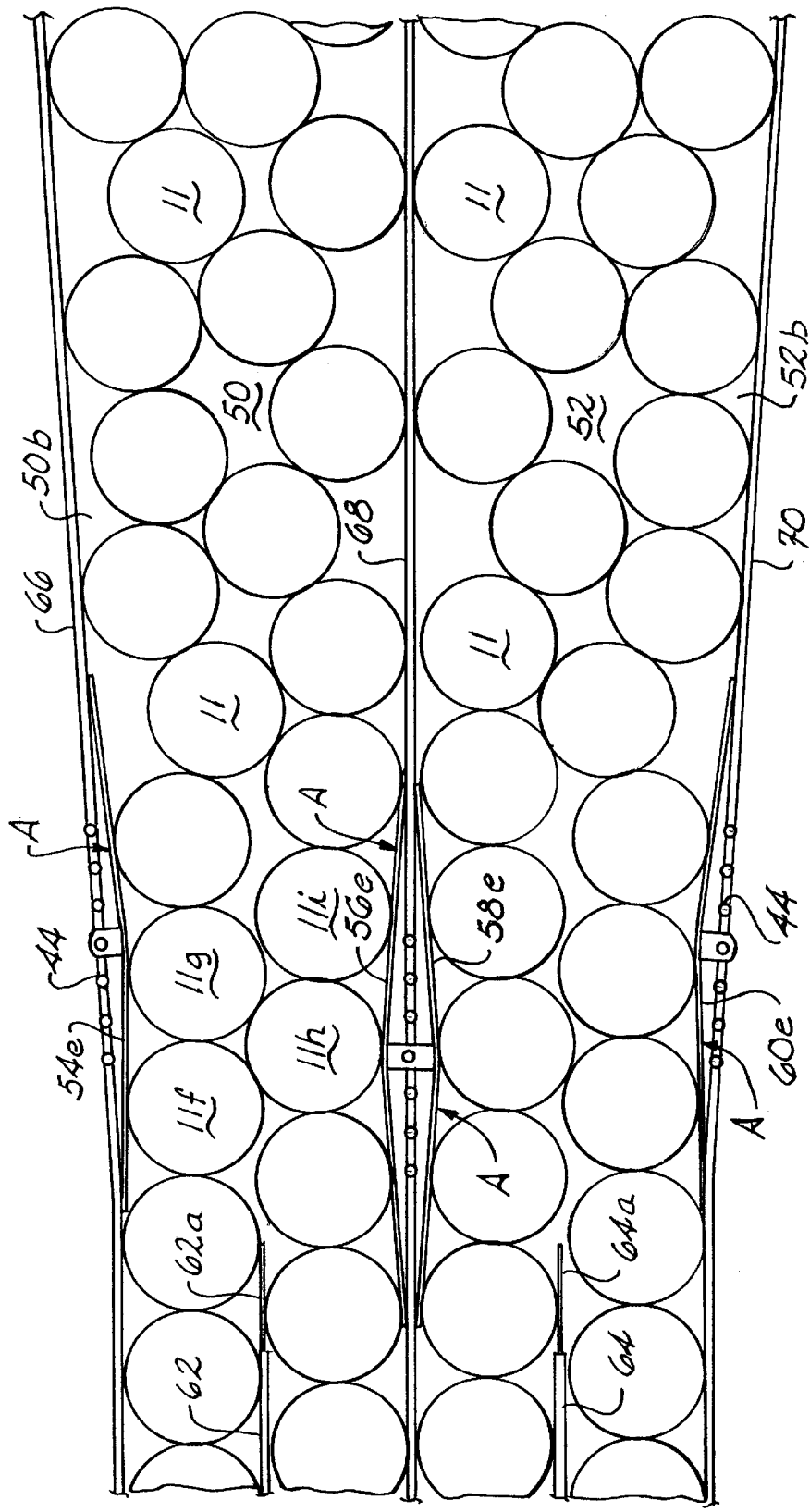
FIG. 5 is an enlarged top plan view illustrating the racking and dividing of articles into single files using wedging devices according to the invention in a manner that jamming is prevented during transition into a single file.

Going now to FIG. 5, this embodiment of the invention will be described in more detail. In this embodiment, two descrambling lanes taper into four single-file lanes, which is advantageous for retrofitting of existing machines. It can be seen that lane 50 is divided into single files 54 and 56 by an intermediate lane divider 62 and that lane 52 is divided into single file lanes 58 and 60 by an intermediate lane divider 64. Each lane divider 62 and 64 includes a thin divider blade 62a and 64a which has its center line generally aligned with the racking axis of the articles. The thin blade 62a and 64a is preferably flexible and assists in the single file arranging of the articles. There is a first wedging device 54e affixed to an outside lane divider 66 and a double wedging device which includes a wedging device 56e and wedging device 58e affixed to a lane divider 68. A fourth wedging device 60e is affixed to an outside lane divider 70.

Figure 3:
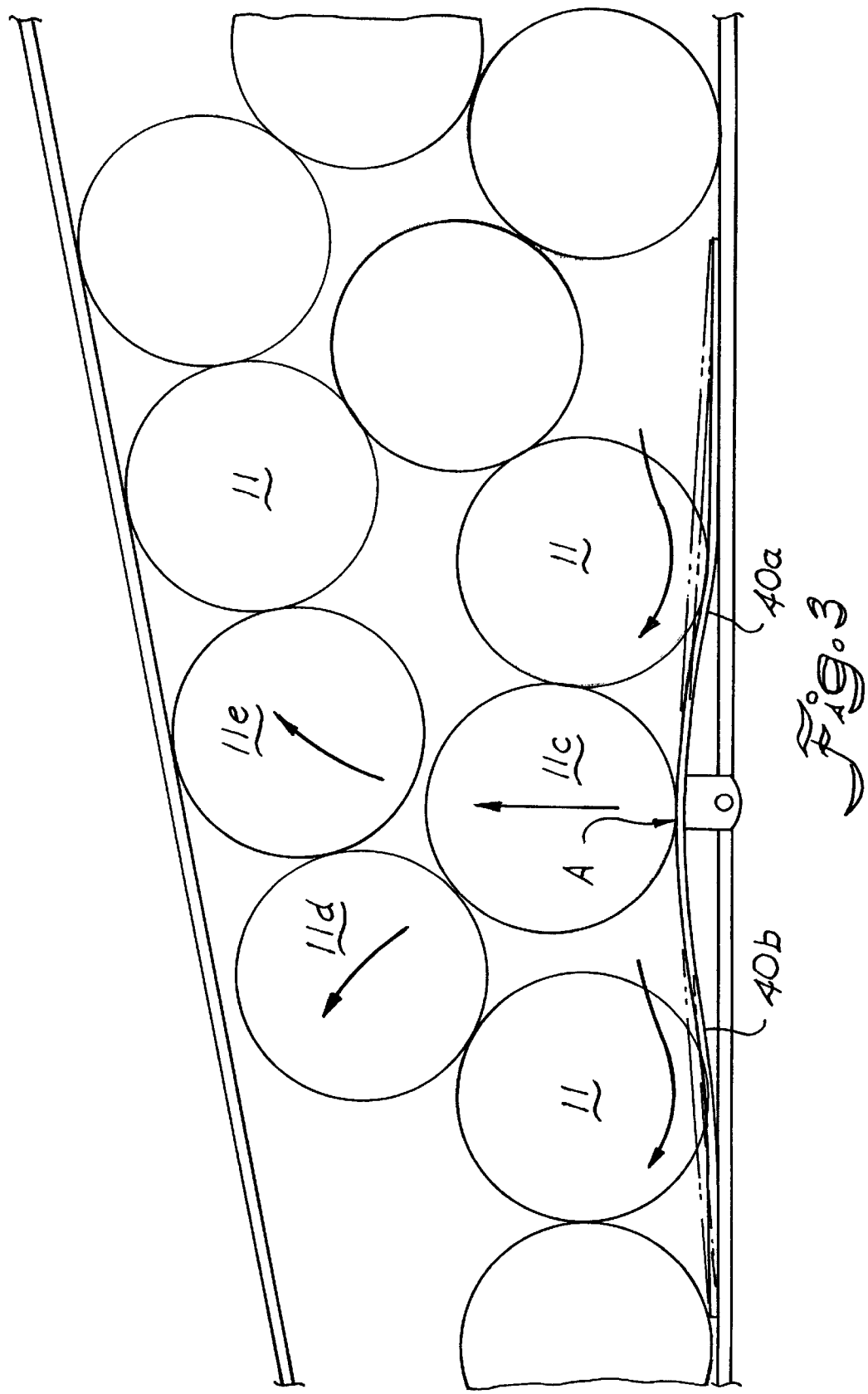
FIG. 3 is a top plan view illustrating the racking or anti-jamming action of a wedging device according to the invention by deflection of kicking plates of the wedging device which rack the articles and prevent jamming.
Figure 4:
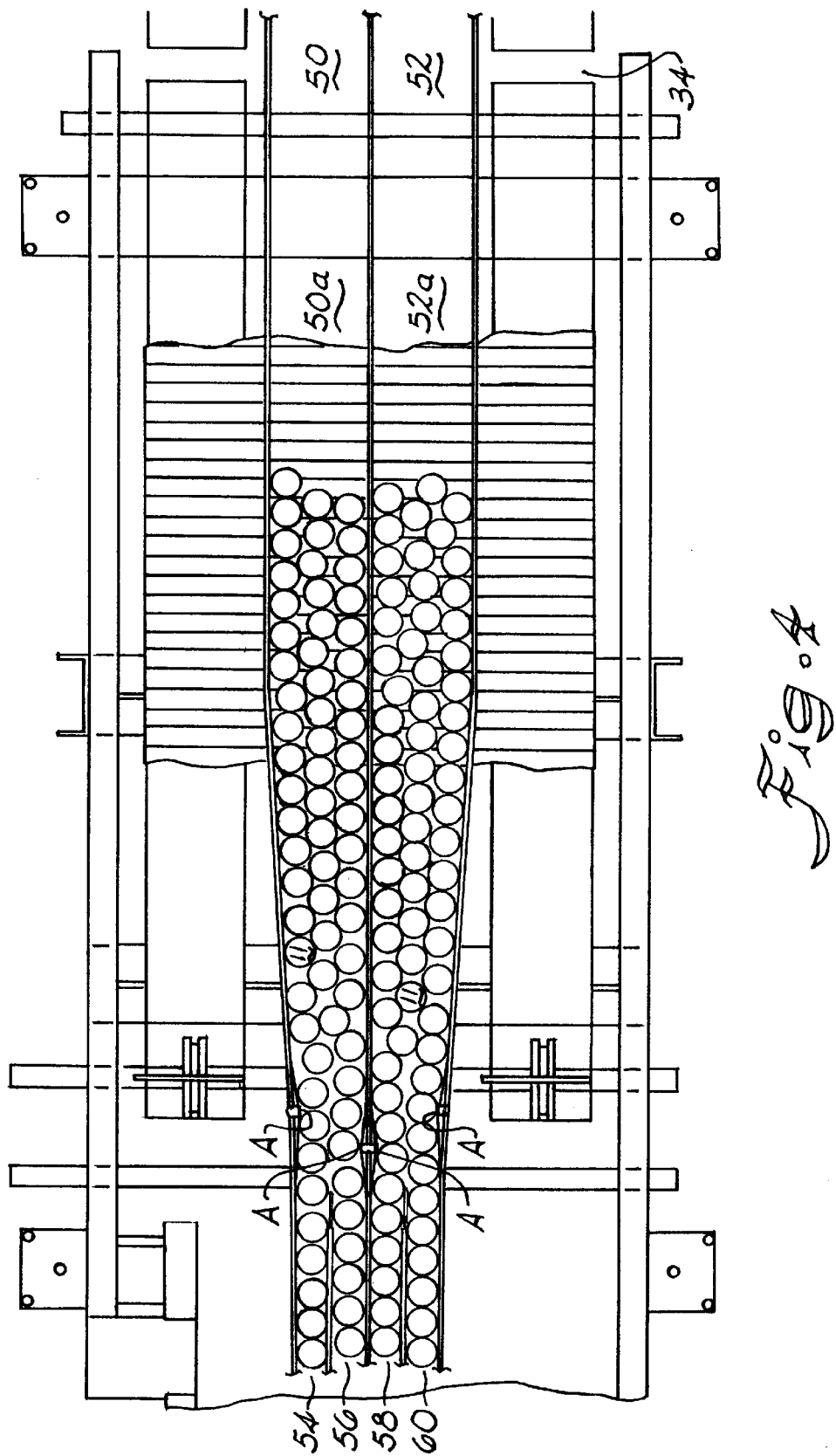
FIG. 4 is an alternate embodiment of the present invention wherein two lanes having a width greater than a lateral row of three articles feed and divide the articles into single files using wedging devices which prevent jamming according to the invention.

As described in reference to FIGS. 2 and 3, the articles are conveyed through a tapering transition section, generally in an area designated 50b, through the throats of the wedging devices 54e, 56e. The same is true of a general transitioning area 52b in respect to lane 52. Each wedging device comprises a flexible in feed kicker plate and a flexible out feed kicker plate as described previously. The relative longitudinal placement of the kicker plates in the respective lanes is adjusted using the post 54 carried on the lane dividers as previously described. The positioning is adjusted to yield the racking results illustrated between Articles 11f, 11g, 11h, and 11i as can best be seen in FIG. 5 in respect to lane 50, and the same is true in respect to lane 52. The articles are allowed to expand by the flexing of the infeed plates until they reach the throat where they cannot become side-by-side. The articles are likewise arranged in a single file as they travel over the outfeed plates which allows any needed accommodation or expansion to prevent jamming.

Thus, it can be seen that an advantageous construction can be had for feeding articles from a scrambled mass into descrambled single files wherein, at the entry openings of the lanes, parallel sections are provided having a width of at least about three times the width of the articles being conveyed which prevents jamming at the entry end of the conveyor. The laner is advantageously constructed so that the articles cannot become side-by-side in a jamming relation, and as they approach the transition area into the single files, the wedging device of the invention is provided which racks the articles, facilitating and processing the articles into the single file lanes whereby a more efficient and reliable descrambling of the articles is had with reduced jamming or malfunctioning as often results in conventional laners and case packing machines.

While a preferred embodiment of the invention has been described using specific terms, such description is for illustrative purposes only, and it is to be understood that changes and variations may be made without departing from the spirit or scope of the following claims.

What is claimed is:

1. Apparatus for descrambling a mass of articles and arranging said articles in single, parallel files on a case packing machine comprising;

a plurality of lane dividers forming a plurality of article lanes arranged in a side-by-side manner;

said article lanes including stationary parallel descrambling sections aligned in a direction of flow of said mass of articles for directly receiving said mass of articles, said parallel lane dividers forming said descrambling sections having a first predetermined width, tapered sections for receiving said articles from said descrambling sections which taper in the direction of conveyance of said articles including transition sections through which said articles pass for processing into parallel single files, and parallel single-file sections receiving said articles from said transition sections having a second predetermined width which corresponds generally to a lateral dimension of said articles so that said articles are arranged generally in single files in said single-file sections;

a plurality of racking devices carried in said transition section of said lanes upstream from said single file sections;

said racking devices projecting laterally into said transition sections of said lanes for engaging said articles as they are conveyed causing said articles to assume a generally racked configuration which reduces jamming as the articles are processed into said single files in said parallel single-file sections of said article lanes;

said racking devices comprising a wedging mechanism which tapers outwardly toward a center of said transition section to an apex portion and then tapers away from said apex portion, said apex portion and said opposing lane divide defining a throat forming a constriction in said transition section; and an adjustable mount mounting said racking devices to said lane dividers of said article lanes at different positions along a length of said lane dividers, said mount including a mounting member carried by said racking devices at said apex portion, and cooperating mounting elements carried at intervals along said lane dividers engageable with said mounting member for attaching said racking devices at different positions along the length of said articles lanes.

2. The apparatus of claim 1 wherein said wedging mechanism includes an infeed kicker plate which tapers outwardly toward said center of said transition section, and an outfeed kicker plate which tapers inwardly away from the center of said transition section.

3. The apparatus of claim 2 wherein said kicker plates are flexible.

4. The apparatus of claim 2 wherein said infeed kicker plate and said outfeed kicker plate join at said apex portion which defines said throat forming a constriction in said transition section.

5. The apparatus of claim 4 wherein said throat is defined between said apex portion and an opposing lane divider said lane so that said transition section is constricted in relation to the flow of said articles.

6. The apparatus of claim 1 wherein said first predetermined width is approximately three (3) times said lateral dimension of said article.

7. The apparatus of claim 1 wherein said first predetermined width is greater than approximately three (3) times said lateral dimension of said article plus a tolerance in the range of ⅛" to ¼".

8. The apparatus of claim 1, including a first conveyor for feeding scrambled articles to an entry opening of said descrambling lanes, a second conveyor for conveying descrambled articles downstream of said entry opening, a dead space between said first and second conveyors located downstream of said entry opening, and said first conveyor having a conveyance speed less than that of said second conveyor so that a force of impact of said articles is reduced upon entry into said entry opening and inward collapse into said opening is provided to reduce jamming.

9. Apparatus for descrambling a mass of articles and arranging said articles in single, parallel files on a case packing machine comprising;

a plurality of lane dividers forming a plurality of article lanes arranged in a side-by-side manner;

each said article lane beginning with a descrambling section formed by substantially parallel lane dividers having a first predetermined spacing which is generally greater than about three times a lateral dimension of said articles;

each said article lane terminating in a single-file section formed by substantially parallel lane dividers having a second predetermined spacing which corresponds generally to said lateral dimension of said articles so that said articles are arranged generally in a single file in said single-file section;

each said article lane including a tapered section extending between said descrambling section and said single-file section which include a transition section through which said articles pass for processing into parallel single files for feeding into said single-file sections;

a racking device carried in said transition section of each said lane upstream from said single-file section for engaging said articles as they are conveyed causing said articles to assume a generally racked configuration in which jamming is reduced as the articles are processed into said single files in said parallel single-file sections of said article lanes; and said racking devices comprising a flexible infeed kicker plate which tapers outwardly toward a center of said transition section, a flexible outfeed kicker plate which tapers inwardly away from the center of said transition section, said infeed and outfeed kicker plates join at a generally rigid apex portion which defines a throat forming a constriction in said transition section defined between said apex portion and an opposing lane divider of said lane so that said transition section is constricted in relation to the flow of said articles, and a bridge mount extending generally between said apex portion and a lane divider on which said racking device is carried.

10. The apparatus of claim 9 including an adjustable mount for mounting said racking devices at longitudinally adjustable positions along the length of said transition sections of said article lanes.

11. The apparatus of claim 9 wherein said throat has a dimension which is less than the dimension of two of said articles in a side-by-side arrangement.

12. The apparatus of claim 9 wherein said first predetermined width is greater than three (3) times said lateral dimension of said article plus a tolerance in the range of ⅛" to ¼".

13. The apparatus of claim 9 including a first conveyor for feeding scrambled articles to an entry opening of said descrambling lanes, a second conveyor for conveying descrambled articles downstream of said entry opening, a dead space between said first and second conveyors located downstream of said entry opening, and said first conveyor having a conveyance speed less than that of said second conveyor so that a force of impact of said articles is reduced upon entry into said entry opening and inward collapse into said opening is provided to reduce jamming.

14. The apparatus of claim 1 wherein said throat has a dimension which is less than the dimension of two of said articles in a side-by-side arrangement.

15. The apparatus of claim 1 wherein said first predetermined width is greater than at least 2.8 times said lateral dimension of said article.

* * * * *